US009244919B2

(12) United States Patent
Taycher

(10) Patent No.: US 9,244,919 B2
(45) Date of Patent: Jan. 26, 2016

(54) ORGANIZING BOOKS BY SERIES

(71) Applicant: Leonid Taycher, Newton, MA (US)

(72) Inventor: Leonid Taycher, Newton, MA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/770,968

(22) Filed: Feb. 19, 2013

(65) Prior Publication Data

US 2014/0236951 A1     Aug. 21, 2014

(51) Int. Cl.
*G06F 17/30* (2006.01)
(52) U.S. Cl.
CPC ................................ *G06F 17/30011* (2013.01)
(58) Field of Classification Search
USPC .......................................................... 707/737
See application file for complete search history.

(56) References Cited

U.S. PATENT DOCUMENTS

| | | | |
|---|---|---|---|
| 6,665,661 B1 * | 12/2003 | Crow et al. | 707/999.002 |
| 7,213,205 B1 * | 5/2007 | Miwa et al | 715/234 |
| 2004/0133560 A1 * | 7/2004 | Simske | 707/3 |
| 2006/0026152 A1 * | 2/2006 | Zeng et al. | 707/5 |
| 2006/0117002 A1 * | 6/2006 | Swen | 707/4 |
| 2011/0191098 A1 * | 8/2011 | Thomas et al. | 704/9 |

* cited by examiner

*Primary Examiner* — Khanh Pham
(74) *Attorney, Agent, or Firm* — Fenwick & West LLP

(57) ABSTRACT

Book information describing a plurality of books is analyzed to identify the plurality of books described in the book information and create book records for the respective ones of identified books. A given book record contains fields describing attributes of a respective one of the plurality of books derived from the book information. The book records are clustered into a plurality of clusters based on the values of the fields of the book records. One or more clusters are analyzed to identify a name of a book series based on the book records therein. The book records in a cluster may further be placed in buckets representing individual books in the series and, in turn, the buckets are described based on the book information therein and organized based their description. The identified series name, bucket descriptions and organization thereof may be stored in a repository and presented to users.

18 Claims, 5 Drawing Sheets

ORGANIZING BOOKS BY SERIES

BACKGROUND

1. Field of Art

The present invention generally relates to the field of searching for content and more specifically to organizing information about related content items.

2. Background Information

Many people use online search engines to search the Internet for information about content such as books, audio recordings, movies and television (TV) shows. There is typically a wide breadth of information about this sort of content on the Internet. In fact, there is so much information that people have difficulty parsing the search results returned by a search engine.

For example, if a person searches for information about a popular book that is part of a series, the search engine might return results associated with multiple different ones of the books in the series. The results might not be organized in a way that reflects the existence of the series which, in turn, makes hard for the person to digest the search results. As a result, the person may not be able to locate searched-for information in the search results.

SUMMARY

The above and other issues are addressed by a method, non-transitory computer-readable storage medium storing executable computer program instructions, and computer system for identifying a book series. An embodiment of the method comprises receiving book information describing one or more books from a book information server. From the received book information, book records identifying the books described by the book information are created. A given book record contains fields describing attributes of a given book in the books derived from the book information. The book records are clustered into a plurality of clusters based on the values of the fields of the book records and one or more clusters are analyzed to identify a name of a book series for the books identified by the book records in the one or more clusters. The identified name of the book series for the one or more clusters is then stored in a repository.

An embodiment of the non-transitory computer-readable storage medium stores executable computer program instructions for identifying a book series, the instructions performing steps comprising receiving book information describing one or more books from a book information server. From the received book information, book records identifying the books described by the book information are created. A given book record contains fields describing attributes of a given book in the books derived from the book information. The book records are clustered into a plurality of clusters based on the values of the fields of the book records and one or more clusters are analyzed to identify a name of a book series for the books identified by the book records in the one or more clusters. The identified name of the book series for the one or more clusters is then stored in a repository.

An embodiment of the computer system comprises a non-transitory computer-readable storage medium storing executable computer program instructions to perform steps for identifying a book series. The computer system receives book information describing one or more books from a book information server. From the received book information, the computer system identifies the books described by the book information and creates book records for the respective ones of books. A given book record contains fields describing attributes of a given book in the books derived from the book information. The computer system clusters the book records into a plurality of clusters based on the values of the fields of the book records. Additionally, the computer system analyzes one or more clusters to identify a name of a book series for the books identified by the book records in the one or more clusters. The computer system stores the identified name of the book series for the one or more clusters in a repository.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures.

Figure 1:
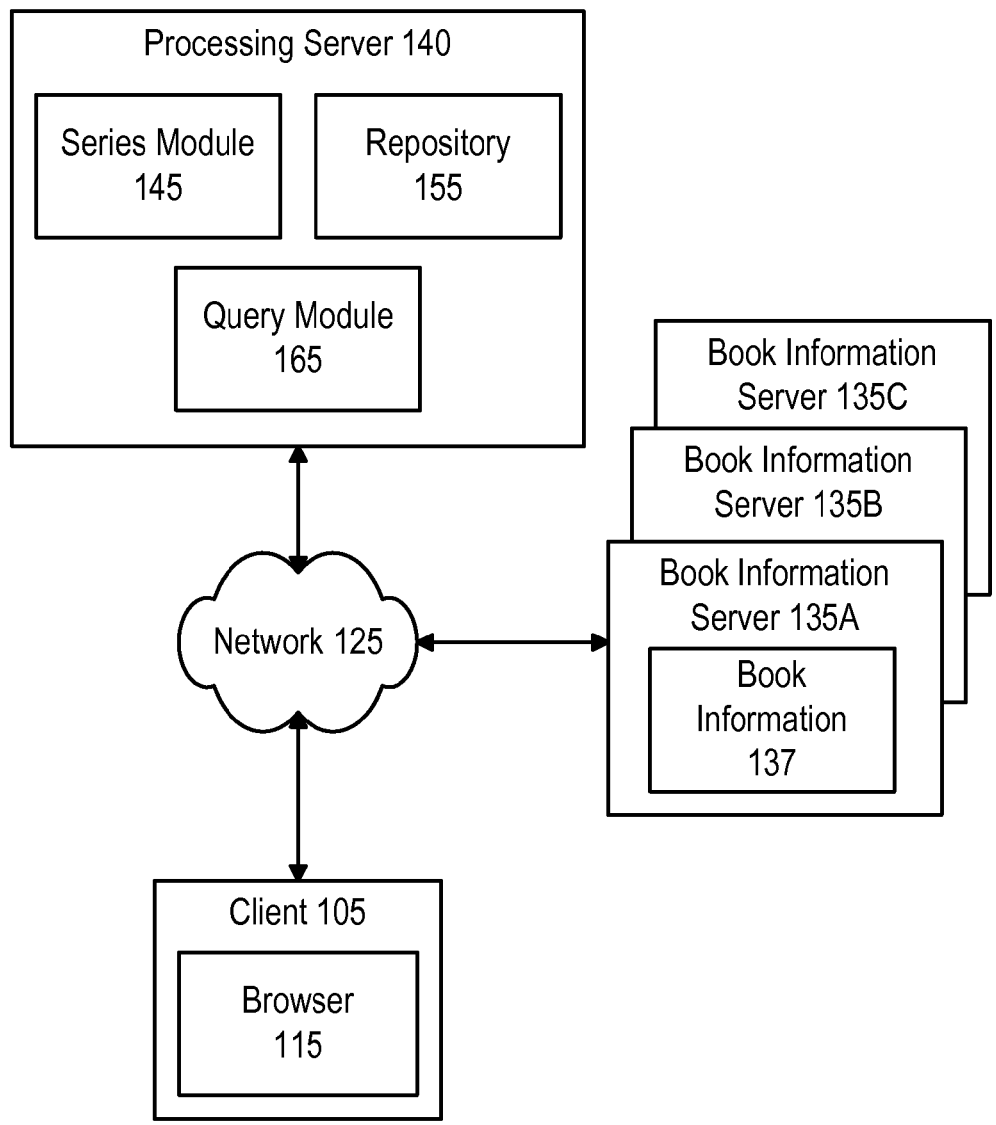
FIG. 1 is a high-level block diagram illustrating an environment for organizing book by series according to one embodiment.

FIG. 1 is a high-level block diagram illustrating an environment 100 for organizing books by series according to one embodiment. As shown, the environment 100 includes a network 125 connecting a client 105 to a processing server 140 and multiple book information servers 135. While only one client 105 and processing server 140 are shown in FIG. 1 for clarity, embodiments can have many clients 105 and processing servers 140. In addition, the processing server 140, as well as the book information servers 135, may be implemented as cloud-based services distributed across multiple physical servers.

For clarity this description uses the term "book" to refer to a published work. Thus, a book may be a conventional book as well as other types of published works such as magazines, journals, newspapers, audio recordings, video games, movies and television (TV) programs.

A book has associated attributes, such as a title, author (and/or contributor), publisher, and publication date. Moreover, a book may belong to a series, where a series is a sequence of books having certain characteristics in common that are identified together as a group. A series is identified by a series name. A series may be organized in different ways, such as by author (i.e., for a literary series) or a collection of works by different authors (i.e., contributors to a monograph series) marketed by a publisher. A book that is part of a series has an associated series name that identifies the series of which the book is a member. For example, seven book titles by the author J. K. Rowling form the well-known HARRY POTTER® book series. A series itself may have multiple components, referred to as "subseries." A subseries is also identified by a series name, but may also be identified (collectively with any other subseries) using the name of the series for which the subseries is a constituent.

The client 105 is a computer or other electronic device used by one or more users to execute applications for performing various activities. For example the client 105 can be a desktop, notebook, or tablet computer, a mobile telephone, dedicated eBook reader, or television set-top box. The applications executed by the client 105 may include web browsers 115, eBook readers, word processors, media players, spreadsheets, image processors, security software, etc. In one embodiment, the client 105 includes a global positioning system sensor or other technology that detects the client's physical location. The client 105 may, in turn, provide the detected location to the processing server 140 for localizing information provided to the client.

In embodiments in which the processing server 140 discussed herein collects personal information about the client 105 and its users, or may make use of personal information, the users may be provided with an opportunity to control whether programs or features collect user information (e.g., information about a user's social network, social actions or activities, profession, a user's preferences, or a user's current location), or to control whether and/or how to receive information from the processing server 140 that may be more relevant to the user. In addition, certain data may be treated in one or more ways before it is stored or used, so that personally identifiable information is removed. For example, a user's identity may be treated so that no personally identifiable information can be determined for the user, or a user's physical location may be generalized where location information is obtained (such as to a city, ZIP code, or state level), so that a particular location of a user cannot be determined. Thus, the user may have control over how information is collected about the user and used by the processing server.

Book information servers 135A-C store varying amounts of book information 137 about books. The book information servers 135 make the book information 137 available to the processing server 140 via the network 125. For example, the book information servers 135 may provide web pages, catalog records, data feeds, or other types of data conveying book information 137 to the processing server 140. The book information servers 135 may be operated, for example, by book publishers, libraries, and booksellers. Thus, a publisher may provide book information 137 about available, upcoming or out-of publication books published by the publisher, a library may provide book information about books held by the library, and a bookseller may provide book information about books it sells. While only three book information servers 135 are shown in FIG. 1, there may be hundreds of book information servers in some embodiments.

In general, the book information 137 about a book provided by the book information servers 135 includes bibliographical information such as an author (and/or contributor) name, series name, subseries name, book title, book number (e.g., position within a series), publisher, publication year, and International Standard Bibliographic Number (ISBN). The book information 137 may also include image information such as an image of a physical book's cover, and character information describing characters referenced in the book. Other book information 137 may include portions of text from the book, text of reviews of the book, colloquial descriptions of the book, audio, and/or images from the book, sales ranks, etc. The book information 137 provided by the book information servers 135 may be structured to explicitly identify the types of information contained therein. In one embodiment, the book information servers 135 provide book information 137 to the processing server 140 in the form of Extensible Markup Language (XML) data.

The processing server 140 receives the book information 137 from the book information servers 135 and stores it in a repository 155. In one embodiment, the repository 155 is a database and holds information arranged in records. The repository 155 may be local to the processing server 140 or at a remote location. For example, the repository 155 may be implemented as a separate cloud-based service or as a storage-area network.

A series module 145 analyzes the book information 137 stored in the repository 155 to identify series of books described therein. In one embodiment, the series module 145 creates book records identifying the instances of books described by the book information 137. The series module 145 clusters the book records and analyzes information within a cluster and among two or more of the clusters to identify book series information. Additionally, in some embodiments, the series module 145 clusters the various book records describing a particular publication (or release) of a book into a tome record. Multiple tome records (i.e., one for each publication) may exist for the same abstract book of a book series. The series module 145, in turn, may analyze tome records, based in part on the identified book series information, to identify the constituent books of the book series. The series module 145 stores information describing the identified book series and the constituent books of the series in the repository 155.

A query module 165 uses the information describing the series and books in the repository 155 to provide results in response to search queries received from clients 105 and/or for other information retrieval purposes. In general, the query module 165 uses the information as structured data to inform the search results. The query module 165 may interface with other modules within the processing server 140 or elsewhere that also contribute information to the search results. For example, if a query received from a client 105 includes keywords that match one or more books in a series, the query module 165 may contribute to the search results by using the information about the series and books to group individual search results by books in the series, provide information about the books and series, and/or otherwise enhance the search results. These results may be influenced by the client's geographic location. Thus, the query module 165 uses the information about books and series produced by the series module 145 augment search query results returned to a client 105.

The network 125 represents the communication pathway between clients 105 and the servers 135, 140. In one embodiment, the network 125 uses standard communications technologies and/or protocols and can include the Internet. Thus, the network 125 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 125 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 125 can be represented using technologies and/or formats including the hypertext markup language (HTML), the extensible markup language (XML), JavaScript, VBScript, FLASH, the portable document format (PDF), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 125 can use custom and/or dedicated data communications technologies instead of, or in addition to, the ones described above.

Figure 2:
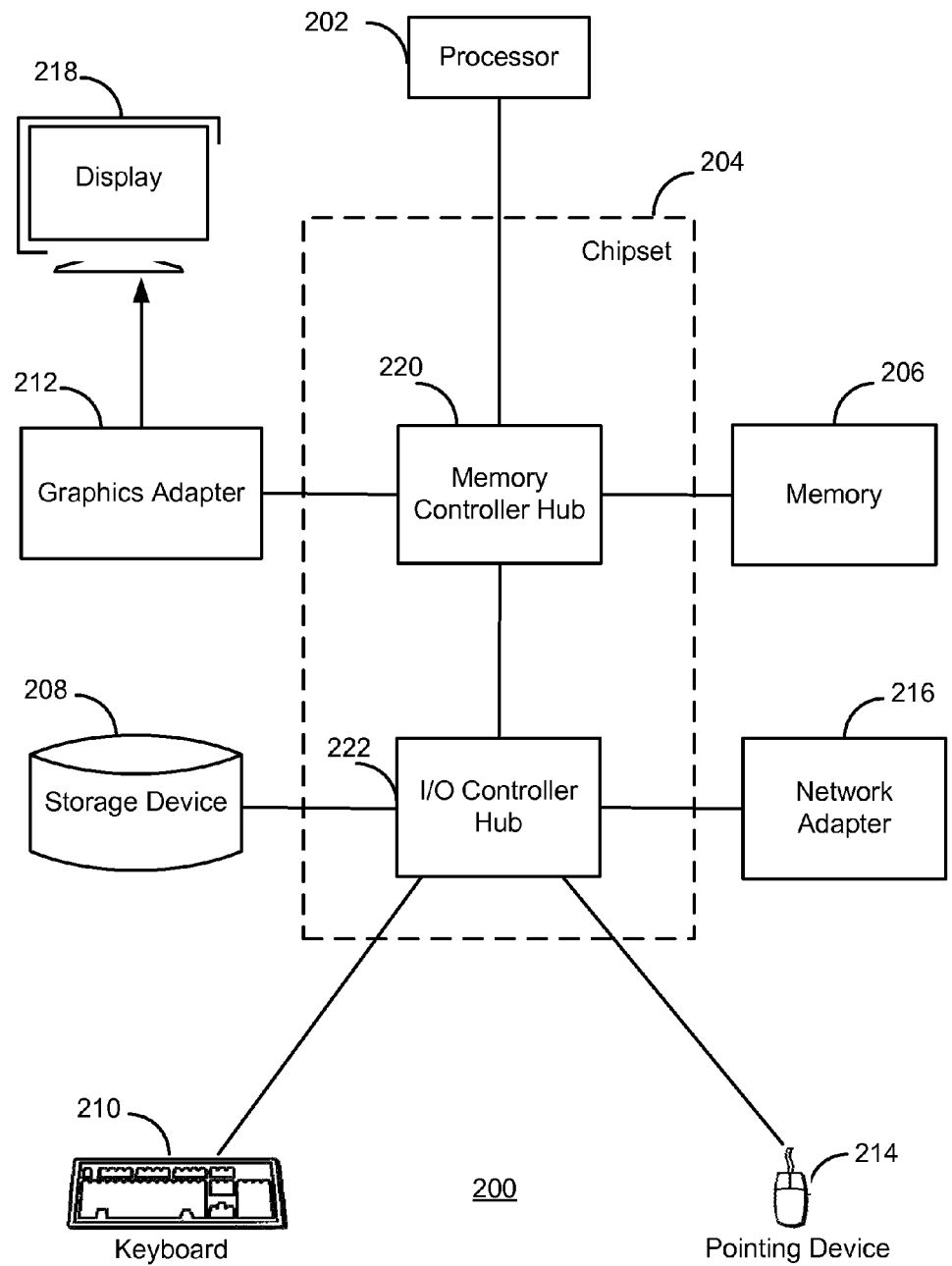
FIG. 2 is a high-level block diagram illustrating an example of a computer for use as a client and/or servers according to one embodiment.

FIG. 2 is a high-level block diagram illustrating an example of a computer 200 for use as a client 105 and/or servers 135, 140 according to one embodiment. Illustrated are at least one processor 202 (CPU) coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 125. Some embodiments of the computer 200 have different and/or other components than those shown in FIG. 2. For example, the servers 135, 140 may be formed of multiple blade servers and lack a display device, keyboard, and other components.

As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202 as one or more processes.

Figure 3:
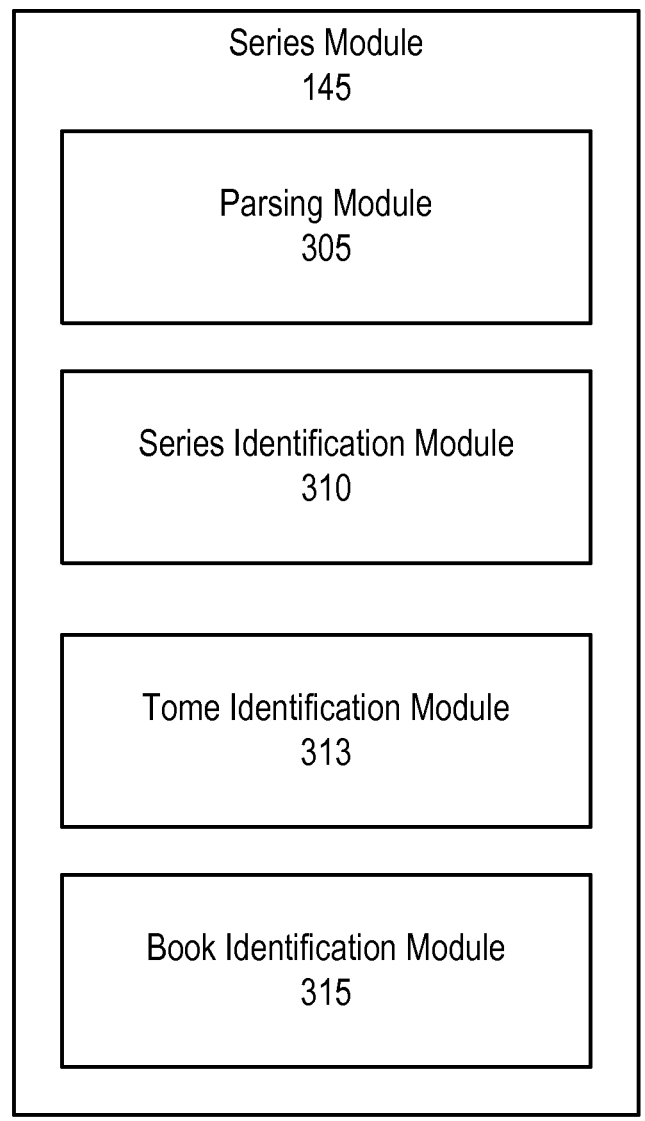
FIG. 3 is a high-level block diagram illustrating a detailed view of a series module of a processing server according to one embodiment.

FIG. 3 is a high-level block diagram illustrating a detailed view of the series module 145 of the processing server 140 according to one embodiment. As shown in FIG. 3, the series module 145 itself includes multiple modules. In the embodiment shown in FIG. 3, the series module 145 includes a parsing module 305, a series identification module 310, a tome identification module 313 and a book identification module 315. In some embodiments, the functions are distributed among the modules in a different manner than described herein. In addition, other embodiments have additional and/or other modules.

The parsing module 305 identifies individual instances of books described by the book information 137. The parsing module 305 parses the book information 137 stored in the repository 155 to create a set of book records, with each book record identifying an instance of a book described by the book information. For example, if book information server 135A provides book information 137 identifying 50 books, the parsing module 305 parses the book information 137 to create 50 book records—one record per book instance. Likewise, if another book information server 135B provides book information 137 identifying 30 books, the parsing module 305 parses the book information to create 30 book records—even if some of these latter 30 book records are for the same books as the former 50 book records or the information server 135B provides book information describing multiple instances (i.e., for 5 different publications) of the same abstract book. Since there are many book information servers 135 providing duplicative information about many different books, the parsing module 305 may create hundreds of millions of book records. The book records are stored in the repository 155.

In one embodiment, each book record includes a standard set of fields, with each field representing an attribute of the book identified from the book information 137. Each field may include a value of the attribute such as a numerical value or text string determined from the book information 137. For example, a book record may contains fields storing values describing the author, series name, subseries name, book title, book number in series, publisher, published country, publication year, ISBN, keywords, language, etc. The book record may also contain one or more fields describing the book information server 135 from which the book information 137 in the record was derived, a timestamp indicating when the book information was retrieved for processing, a cover image for the book, and all or some of the text from the book.

In order to construct the book records, the parsing module 305 analyzes the book information 137 to identify information pertaining to book instances and creates book records for the book instances. The parsing module 305 then parses the information corresponding to a book instance to populate the fields of the corresponding book record. In a specific example, the parsing module 305 may receive (e.g., from a library) a number of catalog records, each referencing a specific book instance and containing book information 137 about the book instance. In turn, for a given catalog record, the parsing module 305 creates a corresponding book record by parsing the book information 137 in the given catalog record to populate the fields of the book record. In an embodiment where the book information 137 is structured, the parsing module 305 may exploit this structure in order to identify the values for the fields of the book records. For example, the book information 137 may include structure explicitly identifying different books, and explicitly indicating the author, publisher, title, etc. for each book. In this case, the parsing module 305 uses the structured data to identify the values corresponding to the fields in the book records.

If the book information 137 is unstructured, the parsing module 305 may use pattern matching or other techniques in order to identify values for the fields. In addition, the parsing module 305 may identify field values by performing transformations of the book information 137, such as using optical character recognition to extract textual content from images of book covers and text pages, using speech-to-text recognition for portions of audio books, etc.

In one embodiment, the parsing module 305 canonicalizes the values in the fields of the book records by converting the values into a standard form. For example, the parsing module 305 may adjust the capitalization of text strings in the "title" field of the book records so that all of the book records use consistent capitalization. Likewise, the parsing module 305 may change all dates described in the book records into the same format. Canonicalization allows book records created using book information 137 from different book information servers 135 to be directly compared since the same information is represented using the same format.

The series identification module 310 analyzes the book records to create series information identifying book series described therein. In one embodiment, the series identification module 310 examines the book records to form clusters (e.g., groupings) of records based on the records' field values. In one embodiment, the series identification module 310 uses a subset of the fields of the book records to perform clustering for identifying series information for clusters of related book records. In one embodiment, the series information for a cluster is identified from common text strings within "title" and "series" fields of the related book records in the cluster.

Accordingly, book records having similar values in the subset of analyzed fields are clustered together. For example, the series identification module 310 may cluster the book records by language, publisher and author to form initial clusters of records having similar values in those fields. Using these fields separates the book records into rough groups that are likely to contain related books (e.g., all of an author's books published by a particular publisher in a particular language). Other embodiments may cluster the book records using additional and/or different fields.

With these formed clusters of book records, the series identification module 310 identifies sets of related clusters. Generally, the series identification module 310 performs this task by determining similarity between values of the book record fields other than the fields used for the clustering. Thus, if the series identification module 310 performs the clustering using values of the author, publisher, and language fields, the series identification module may use other fields such as book title, book number, and series name to identify sets of related clusters. Thus, the series identification module 310 may place two different clusters that contain book records having the same or similar book titles and series names into the same set of related clusters. A set of related clusters may contain only a single cluster if that cluster is not similar to any other clusters.

More specifically, an embodiment of the series identification module 310 analyzes the field values of book records in a cluster in order to identify values common to multiple records. For example, a clustering of HARRY POTTER® books based on author, publisher, and language may produce a cluster of records that have values of book title fields including "Hogwarts Year 1," "Harry Potter Year 1," "Harry Potter and the Sorcerer's Stone" and "Harry Potter and the Philosopher's Stone", etc. The series identification module 310 may analyze these titles to determine that the text "Harry Potter" and "Hogwarts" are common to many of the book title fields of the book records in the cluster. Similarly, the series name field of the book records may contain values such as "Hogwarts Year 1", "Hogwarts Year 2", "Harry Potter 1", "Harry Potter 2", "Year 1 in Hogwarts", "Year 2 in Hogwarts", etc. In turn, the series identification module 310 may analyze these series names to determine that the text "Hogwarts Year X", "Harry Potter X" and "Year X in Hogwarts" are common to many of the book series field of the book records in the cluster. The common text or strings of text are called a "descriptor." The series identification module 310 may identify multiple different descriptors based on different fields of the book records in a cluster.

The series identification module 310 compares the descriptors of different clusters in order to identify related clusters. Clusters that have a high level of similarity among their descriptors are placed in the same set of related clusters. When comparing descriptors of two different clusters, an embodiment of the series identification module 310 computes a string similarity score indicating the level of the level of similarity between the two descriptors. The string similarity score may be calculated using a variety of metrics, such as the edit distance. Two descriptors having a threshold level of similarity are determined to be highly-similar.

The series identification module 310 next analyzes the sets of related clusters to identify the names of book series described therein. For this analysis, the series identification module 310 examines the series name, subseries name and book title fields of the book records in each cluster in a set to identify the frequency of occurrence of the different values for those fields. The series identification module 310 then identifies the most-commonly occurring value for these fields as a series name candidate.

The series identification module 310 compares the series name candidates of the different clusters in a set of related clusters to identify the predominant (e.g., frequently occurring) series name candidate. The series identification module 310 selects this predominant candidate as the name of the series for the books having records in the set of related clusters. If no series name candidate predominates, an embodiment of the series identification module 310 determines that the records in the set of related clusters do not describe a series.

Embodiments of the series identification module 310 may modify the series name selection process described above in a variety of ways to account for different circumstances. In one embodiment, the series identification module 310 may determine that multiple different series name candidates predominate in the set of related clusters. In this case, the series identification module 310 may analyze the book records having the different series name candidates to ascertain a reason for the multiple predominant candidates. This analysis may determine, for example, that one series name candidate is frequently associated with records determined from book information 137 received from book information servers 135 in a first geographic region while the other series name candidate is frequently associated with records determined from book information received from book information servers 135 in another geographic region. Accordingly, the series identification module 310 may determine that the respective regions use different series names to describe the series. In this case, the series identification module 310 may associate both series names with the books having records in the set of related clusters, along with information indicating to which regions the series names apply. The query module 165 can use this information to show the appropriate series name when responding to queries from clients 105 in the different regions.

Additionally, an embodiment of the series identification module 310 may analyze the values of the book record fields to identify subseries of books within the set of related clusters. Field values in the series name, subseries name and book title fields that occur less frequently than the identified predominate series name for the set of related clusters, but still occur multiple times, may identify a subseries name candidate for a subset of book records in the set of related clusters. For example, a cluster of book records may contain many records with the phrase "Star Wars" appearing in the book title, series name, and subseries name fields, causing this phrase to predominate and be selected as a series name candidate. However, a subset of the book records may also include the phrase "The Clone Wars" in these fields. An embodiment of the series identification module 310 recognizes that "The Clone Wars" appears in the subset of records (by, e.g., comparing the number of occurrences with a threshold), and identifies "The Clone Wars" as a subseries of "Star Wars."

Furthermore, an embodiment of the series identification module 310 may analyze the values of the series names and subseries name fields in a cluster to determine whether a same book information server 135 provided records with different values in the same fields. Different values from the same book information server 135 in the series name fields implies that the books represented by the book records are in different series. If the book records include a similar subseries name field value, different values from the same book information server 135 in the subseries name field implies that the books represented by the book records are in a different subseries. Therefore, the series identification module 310 may refine the clustering to separate the records for books in the different series or to identify subseries within the book records.

The tome identification module 313 identifies the specific publications or versions of a book represented in the book records. In one embodiment, the tome identification module 313 analyzes the book records to identify the specific book referenced by each record. Recall that the records in the repository 155 are formed from book information 137 received from multiple book information servers 135 in one embodiment. Therefore, the repository 155 is likely to contain multiple book records each specific book instance.

In one embodiment, the tome identification module 313 selects field values or combinations of field values that represent specific book instances. For example, the tome identification module 313 may assign all book records having the same ISBN value to a given tome. Alternatively, (i.e., if a number of book records lack ISBN values) the tome identification module 313 may assign all book records having the same title and publication date to a given tome record. Other combinations of field values may be used to form the tome records. Ideally, the combination of field values should have a high degree of specificity for grouping book records into specific book instances.

With the tome records formed, the tome identification module 313 analyzes the book records contained within a given tome record to determine the best descriptors for the tome record. For example, if three book records within the tome record have title field values of "Harry Potter and the Sorcerer's Stone" and one book record has a title field values of "Harry Potter Year 1", the tome identification module 313 may determine the best descriptor for the title field value of the tome record is "Harry Potter and the Sorcerer's Stone". The tome identification module 313 may similarly determine best descriptors for other field values such as the series field value and book number in series field value.

Recall that the series identification module 310 associates series descriptors with clusters of related book records and determines the frequency with which the descriptors appear within the book records of a particular cluster and across related clusters. The tome identification module 313 may analyze the series descriptors associated with the clusters which the book records in the tome are assigned to determine series information including a series name for the tome. For example, if the book records in a given tome are clustered together either in the same cluster or related clusters, the tome identification module 313 may determine a series name for the tome based on the predominate (or highest ranked) series descriptor associated with the clusters that is also present in the book records within the tome.

Also recall that a number of lower ranked series descriptors may also occur amongst the related clusters containing the book records assigned to the tome. The tome identification module 313 may analyze these lesser descriptors and their frequencies of occurrence in the clusters to determine any subseries information including possible subseries names for the tome. For example, if the book records in a given tome include subseries descriptors identified during parsing, the tome identification module 313 may determine each potential subseries descriptor's frequency of occurrence within the related clusters containing the book records in the tome and rank the subseries descriptors accordingly. Potential subseries descriptors that appear infrequently in the clusters may be rejected from the ranking as noise from the parsing process or discrepancies in the book information. In one embodiment, subseries names are rejected if they appear as descriptors for less than a threshold percent of related clusters and/or in less than a threshold percent of book records within related clusters.

In a specific example, a tome containing three book records may include subseries descriptors (i.e., for a Star Wars book) including "Episodes IV-VI", "Episodes 4-6", and "Empire Strikes Back, Sequel". The first two subseries descriptors may both appear frequently in the related clusters (e.g., those containing books for any one of Episodes IV-VI) compared to "Empire Strikes Back, Sequel", which may only appear (if at all, and infrequently) in clusters containing books Empire Strikes Back. Episodes IV-VI" and "Episodes 4-6" are, in turn, selected as potential subseries descriptors and ranked by frequency of appearance while "Empire Strike Back, Sequel" may be rejected.

Additionally, in identifying the best descriptors for a given tome record, the tome identification module 313 may refine the potential series, subseries, and title descriptors by identifying the different ways the book records describe the same tome. Specifically, for example, in addition to identifying "Harry Potter and the Sorcerer's Stone" as the best descriptor for the tome, the tome identification module 313 may also identify "Harry Potter Year 1" as an alternate way, or synonym, the book records use for describing the same tome. In one embodiment, the tome identification module 313 rejects synonyms that appear in multiple fields of a same book record (i.e., to account for instances where parsing the book information 137 resulted in storing potential synonyms as distinct entries in multiple fields). In other words, synonyms often appear within the tome record (i.e., due to the different descriptions across book record fields within a tome record) but, typically, not within a given individual book record itself. For example, if multiple individual book records within a tome record individually include both "Star Wars" and "Star Wars: The Clone Wars" as series descriptors, these descriptors represent distinct series (i.e., series and subseries relationship) and therefore are not synonyms for a series name.

Accordingly, potential synonyms that do not appear multiple times in a threshold number of same book records may be rejected as synonyms. In turn, potential synonyms appearing multiple times in a threshold number of same book records may be identified as descriptors for series names having a series/subseries relationship. The thresholds for the determination may be the same to produce a binary classification or different to provide an uncertainty region where neither classification is true. With the synonyms and series/subseries relationships determined, the tome identification module 313 selects the highest ranked (predominate) values to represent the respective field values for the tome. The tome identification module 313 may also store synonyms in association with the respective field values for use in tome bucketing, described below.

The book identification module 315 identifies the books in a series and its subseries (if any). In one embodiment, the book identification module 315 analyzes the tomes created by the tome identification module 313 to identify their series/subseries relationships. Recall that multiple tomes may exist for the various versions and publications of an abstract book. Accordingly, the book identification module 315 may identify the various tomes corresponding to a given abstract book.

In one embodiment, the book identification module 315 operates by establishing a "bucket" representing each abstract book in a series. Accordingly, tomes that represent the different versions of the book are assigned to the bucket.

To this end, the book identification module 315 examines the tomes and assigns each tome to the appropriate bucket, instantiating new buckets to represent books for which no bucket currently exists. For example, the book identification module 315 may assign tomes to a bucket based on a matching of the best descriptors selected for field values such as title, series, subseries and book number in series between tomes. The descriptors selected for the matching step are ideally common between all tomes representing a same abstract book, however, this is not always the case. For example, the title between a U.K. publication and U.S. publication may inherently differ, but loosening the matching specificity may inadvertently assign other books in the same series (but not the same abstract book) to the same bucket (e.g., in instances where naturally, few characters differ between the field views).

In one embodiment, the book identification module 315 uses the textual content of the books records contained in the tomes to assign tomes to buckets. As mentioned above, some book records may contain all or some of the text of the corresponding book. Therefore, the book identification module 315 analyzes text identified in book records assigned to different tomes in order to identify whether the tomes correspond the same abstract book. For this analysis, book text from different records that surpass a threshold level of similarity are determined to be the same. Thus, while the text between book records of a same abstract book that differ to some degree, such as between a U.K. publication and U.S. publication, a looser matching process and corresponding threshold may be used as the amount of text compared is increased.

Buckets created based on text comparisons reliably include a collection of tomes corresponding to the same abstract book in the series and therefore can form a basis for determining the remaining buckets. The book identification module 315 may determine the values of certain fields for buckets created based on text comparisons between tomes, and use the values of those fields to assign other records having the same values to the same bucket. For example, the book identification module 315 may determine that one or more tomes assigned to a same bucket based on text comparisons have a same value for the book number, series and subseries field, and then assign other book records having those same values to that bucket. In one embodiment, the matching of the series and subseries information includes a comparison of synonyms determined for the compared tomes. Additionally, if the fields compared between the tomes include one or more same synonyms for title, series and/or subseries descriptors, the book identification module 315 may assign the tomes to the same bucket.

As described above, the book identification module 315 may use the book title field to assign tomes to a same bucket if the book title field values are the same. In one embodiment, the book identification module 315, prior to determining bucket assignments using book title, removes a series name and subsequently any subseries name identified for a tome (as determined by the tome identification module 313) from the value of the book title field if found therein. If an extraction would leave the field blank, however, the book identification module 315 does not remove the name from the book title as the book title is likely the same as the series or subseries name (e.g., the first book in the series or subseries). Removing the series and subseries names from the value of the book name fields makes the book name title comparisons more reliable.

With a number of tome records collected in a same bucket, the book identification module 315 may examine the best descriptors associated with the tomes in the bucket to determine descriptors for one or more of the fields, such as the book title, series, subseries and book number fields. The descriptors for the fields are the descriptors for the bucket which, in turn, are the descriptors for the book represented by the bucket. The book identification module 315 may identify the frequency of occurrence of the different values for those fields and then identify the most commonly occurring value as a best descriptor. The book identification module 315 may determine the frequency of occurrence solely based on the best descriptors associated with the tomes.

The book identification module 315 may select multiple different descriptors for a field. In one embodiment, the book identification module 315 determines if multiple values for a particular field predominate (e.g., occur more than a threshold number of times or occur in at least a certain percentage of the tomes). Such a situation might arise, for example, if a book was published with different titles in different geographic regions, or if different releases of a book were published with different titles. In this situation, an embodiment of the book identification module 315 examines the values of other fields in the tomes to identify characteristics that distinguish the different values for a same field from each other. For example, the book identification module 315 may determine for a bucket that the book title field values of tomes in the bucket having records retrieved predominately from a first geographic region tend to have a first descriptor, and book title field values of tomes in the bucket having records retrieved predominately from a second geographic region tend to have a second descriptor. The book identification module 315 may store these identifying characteristics in association with the descriptors determined for the field values of the bucket.

Once the books in a series are identified by the corresponding buckets, an embodiment of the book identification module 315 determines the order of the books in the series. The book identification module 315 may use the descriptors for the book number fields of the buckets to order the books. In one embodiment, the book number descriptors are ordinal numbers. Thus, the book identification module 315 ranks the buckets based on the values of the book number descriptors to determine the order of the books in the series. Other embodiments of the book identification module 315 order the books using descriptors of other fields and/or using other techniques. For example, if the book title field descriptor for a bucket is the same as the series name or subseries name, the book identification module 315 can use this fact to determine that the book represented by that bucket is the first book in the series or subseries.

In one embodiment, the book identification module 315 determines if any two buckets share the same book number. This situation may indicate that the tomes assigned to one of the buckets represent books in a subseries. To determine whether a subseries is present, the book identification module 315 determines if the book records associated with any tomes in the two buckets were received from the same book information server 135. If one book information server 135 supplied book records in each bucket, then this fact signals that the book numbers of the records are likely correct and, therefore, a subseries is likely present. In contrast, if the book records of the two buckets are from different book information servers 135, this fact signals the possibility that some of the records contain erroneous, contradictory and/or geographic based differences in information but do not necessarily indicate the presence of a subseries. If a subseries is present, the book identification module 315 may perform additional analysis of the tomes and their associated book records in the buckets to distinguish the subseries from the series.

Figure 4:
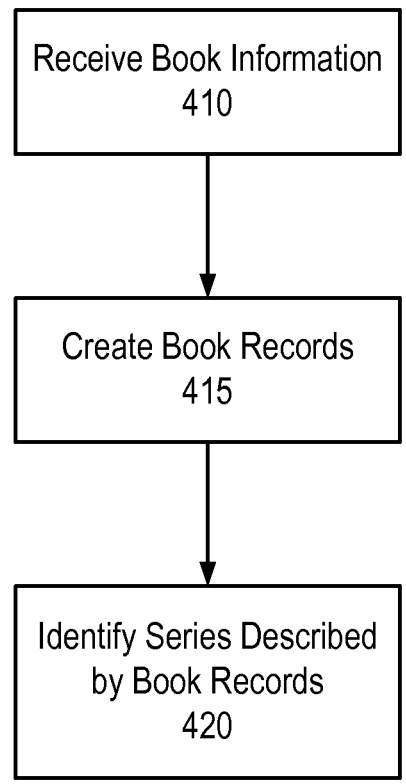
FIG. 4 is a flowchart illustrating a method for identifying series information in book information according to one embodiment.

FIG. 4 is a flowchart illustrating a method for identifying series information in book information according to one embodiment. The steps of FIG. 4 may be performed by the processing server 140. Some or all of the steps may be performed by other entities in other embodiments. In addition, other embodiments may perform different and/or other steps than those described herein. Furthermore, steps may be performed in parallel or in different orders.

The processing server 140 receives 410 book information 137 from multiple book information servers 135. The book information 137 includes bibliographical and other information describing multiple books. Different book information servers 135 may provide book information 137 about the same books. The processing server 140 creates 415 book records from the book information 137. A book record identifies instances of books described by the book information 137. In one embodiment, each book record includes a standard set of fields storing values describing attributes of the corresponding identified instance of a book derived from the book information 137.

The processing server 140 identifies 420 series described by the book records. In one embodiment, the processing server 140 examines the book records to form multiple clusters of records based on the records' field values. For example, processing server 140 may cluster together book records that have similar values for a specified subset of fields.

The processing server 140 then identifies sets of related clusters by relating clusters that have similar values in fields other than the fields on which the records were clustered. Each set of related clusters may describe a book series, and the processing server 140 analyzes the sets of related clusters to identify potential names of the book series for the books identified by the records in the clusters.

In one embodiment, the processing server 140 performs this analysis by identifying series name candidates for each related cluster in a set, and then ranking the name candidates based on their prevalence among the book records in a cluster and among the set of clusters related to the cluster.

Figure 5:
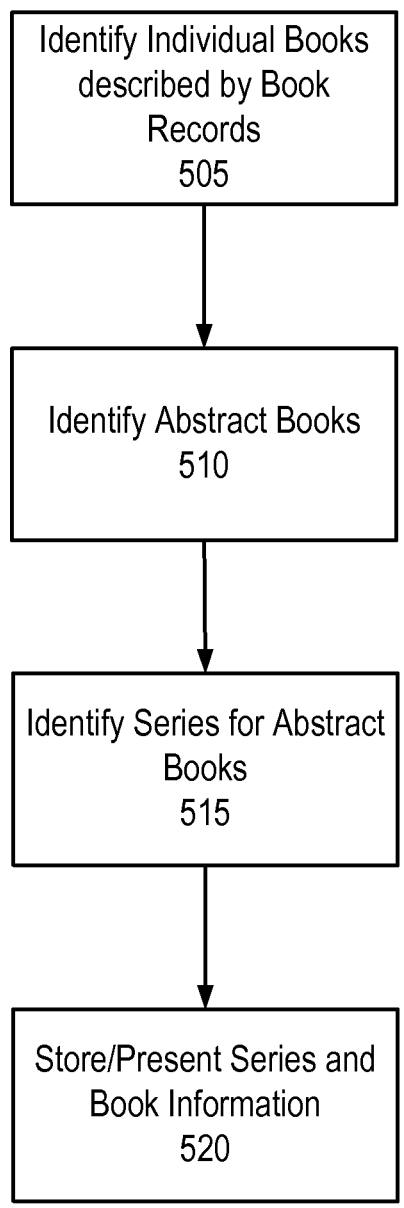
FIG. 5 is a flowchart illustrating a method for organizing books by series according to one embodiment.

FIG. 5 is a flowchart illustrating a method for organizing books by series according to one embodiment. The steps of FIG. 5 may be performed by the processing server 140. Some or all of the steps may be performed by other entities in other embodiments. In addition, other embodiments may perform different and/or other steps than those described herein. Furthermore, steps may be performed in parallel or in different orders.

An embodiment of the processing server 140 also identifies 505 the individual the books described by the book records. One embodiment of the processing server 140 assigns the book records to tomes, where each tome represents a different version or publication of the same abstract book. The processing server 140 may assign book records to a tome buckets based on based on values of certain fields, such as the ISBN, publication date and title fields, and/or using other techniques.

With a number of book records assigned to a tome, the processing server 140 may determine field values for the tome based on the book records contained therein. In one embodiment, the processing server 140 employs a majority rules selection for field values where the predominate value occurring among the book records is selected. For some field values, such as those related to series information, the processing server 140 may determine the predominate values based on the potential series names identified for the clusters and related clusters to which the book records contained in the tome were associated with in step 420. In some embodiments, the processing server 140 selects more than one value if multiple values predominate.

The processing server 140 then identifies abstract books 510, one of which may have multiple tomes for the different versions and publications. In one embodiment, the processing server 140 assigns tomes to buckets which represent the abstract book. The processing server 140 may determine whether to assign two tomes to a same bucked based on textual similarity of books records within each tome for which text is available, based on values of certain fields, such as tile title, series/subseries, and book number in series fields, and/or using other techniques.

The processing server 140 then identifies 515 series information including title, series name, subseries name and number in series for the abstract books. Here, the processing server 140 may select the field values that predominate among the tomes assigned to a bucket to describe the bucket. In some situations, such as where a title for the abstract book differs from two countries and thus tomes in the bucket have different title field values, more than one best value for a field may be determined. When this situation occurs within the bucket, descriptors (e.g., geographical information in the above example) identifying the difference between the tomes are determined.

With the series name, subseries name, and number in series for each abstract book determined, the books may be ordered accordingly to form the series. In one embodiment, if multiple buckets are assigned to the same position within the series, the processing server 140 determines whether the buckets should be merged by examining any book records that were retrieved from a same book information server 135. If many book records in both buckets were described in book information from same book information servers 135, the buckets very likely indicate a series—subseries relationship and a new location (e.g., in a subseries) for one of the buckets is determined. Otherwise, the buckets very likely describe the same abstract book and may be merged. The processing server 140 thus identifies the order of the books in the series based, for example, on the predominate values of the book number fields of the tomes in the buckets.

The processing server 140 stores 430 information describing the identified series and books therein in the repository 155. The processing server 140 may also present 430 this information to users of clients 105. For example, the processing server 140 may use the information describing the series and books to provide results in response to search queries received from clients 105. Thus, the processing server 140 identifies the series and books in the series described in the book information 137 and uses the identified series and books to augment search query results returned to clients 105.

The above description is included to illustrate the operation of certain embodiments and is not meant to limit the scope of the disclosure. The scope of the disclosure is to be limited only by the following claims. From the above discussion, many variations will be apparent to one skilled in the relevant art that would yet be encompassed by the spirit and scope of the disclosure.

The invention claimed is:

1. A computer-implemented method of identifying a book series, comprising:
   receiving book information describing one or more books from a book information server;
   creating book records identifying the books described by the book information, a book record having fields with values describing attributes of a given book in the books derived from the book information;

clustering the book records into a plurality of clusters based on the values of a subset of the fields of the book records;
identifying a set containing a plurality of related clusters of book records by determining similarity of values of fields of the clustered book records other than the subset of fields on which the records were clustered;
identifying a separate series name candidate for each cluster in the set to produce a plurality of series name candidates;
selecting a name of the book series from among the plurality of series name candidates by comparing the plurality of series name candidates to identify a predominant series name candidate;
storing information describing the selected name of the book series in a repository; and
identifying a set of books in the book series having the selected name.

2. The method of claim 1, wherein the book information is received from a plurality of book information servers and wherein creating the book records comprises:
creating a book record for each book identified in the book information from the plurality of book information servers.

3. The method of claim 1, wherein identifying a separate series name candidate for a cluster comprises:
examining one or more of a series name field, subseries name field and book title field of the book records in the cluster to identify a commonly-occurring value; and
identifying the commonly-occurring value as the series name candidate for the cluster.

4. The method of claim 1, wherein identifying a set of books in the book series having the selected name comprises:
assigning the book records in the plurality of related clusters to a plurality of buckets, with each bucket representing a book in the book series, the assigning responsive at least in part to values of fields of the book records.

5. The method of claim 1, further comprising:
determining an order of the books in the book series responsive at least in part to values of fields of the book records.

6. The method of claim 1, further comprising:
providing information describing the identified name of the book series responsive to a search query received from a client.

7. The method of claim 1, wherein identifying a set containing a plurality of related clusters comprises:
analyzing a field of book records within a first cluster to identify a first value common to the field in a plurality of book records within the first cluster;
analyzing the field of book records within a second cluster different than the first cluster to identify a second value common to the field in a plurality of book records within the second cluster;
comparing the first value with the second value to determine a level of similarity between the first value and the second value; and
placing the first cluster and the second cluster in the set containing the plurality of related clusters responsive to the level of similarity between the first value and the second value.

8. A non-transitory computer-readable storage medium storing executable computer program instructions for identifying a book series, the instructions performing steps comprising:
receiving book information describing one or more books from a book information server;
creating book records identifying the books described by the book information, a book record having fields with values describing attributes of a given book in the books derived from the book information;
clustering the book records into a plurality of clusters based on a subset of the values of the fields of the book records;
identifying a set containing a plurality of related clusters of book records by determining similarity of values of fields of the clustered book records other than the subset of fields on which the records were clustered;
identifying a separate series name candidate for each cluster in the set to produce a plurality of series name candidates;
selecting a name of the book series from among the plurality of series name candidates by comparing the plurality of series name candidates to identify a predominant series name candidate;
storing information describing the identified name of the book series in a repository; and
identifying a set of books in the book series having the selected name.

9. The computer-readable medium of claim 8, wherein the book information is received from a plurality of book information servers and wherein creating the book records comprises:
creating a book record for each book identified in the book information from the plurality of book information servers.

10. The computer-readable medium of claim 8, wherein identifying a separate series name candidate for a cluster comprises:
examining one or more of a series name field, subseries name field and book title field of the book records in the cluster to identify a commonly-occurring value; and
identifying the commonly-occurring value as the series name candidate for the cluster.

11. The computer-readable medium of claim 8, wherein identifying a set of books in the book series having the selected name comprises:
assigning the book records in the plurality of related clusters to a plurality of buckets, with each bucket representing a book in the book series, the assigning responsive at least in part to values of fields of the book records.

12. The computer-readable medium of claim 8, further comprising:
determining an order of the books in the book series responsive at least in part to values of fields of the book records.

13. The computer-readable medium of claim 8, further comprising:
providing information describing the identified name of the book series responsive to a search query received from a client.

14. A computer system for identifying a book series, the computer system comprising:
a non-transitory computer-readable storage medium storing computer program instructions executable to perform steps comprising:
receiving book information describing one or more books from a book information server;
creating book records identifying the books described by the book information, a book record having fields with values describing attributes of a given book in the books derived from the book information;

clustering the book records into a plurality of clusters based on the values of a subset of the fields of the book records;

identifying a set containing a plurality of related clusters of book records by determining similarity of values of fields of the clustered book records other than the subset of fields on which the records were clustered;

identifying a separate series name candidate for each cluster in the set to produce a plurality of series name candidates;

selecting a name of the book series from among the plurality of series name candidates by comparing the plurality of series name candidates to identify a predominant series name candidate;

storing information describing the identified name of the book series in a repository; and identifying a set of books in the book series having the selected name; and a processor for executing the computer program instructions.

15. The computer system of claim 14, wherein the book information is received from a plurality of book information servers and wherein creating the book records comprises:

creating a book record for each book identified in the book information from the plurality of book information servers.

16. The computer system of claim 14, wherein identifying a separate series name candidate for a cluster comprises:

examining one or more of a series name field, subseries name field and book title field of the book records in the cluster to identify a commonly-occurring value; and identifying the commonly-occurring value as the series name candidate for the cluster.

17. The computer system of claim 14, wherein identifying a set of books in the book series having the selected name comprises:

assigning the book records in the plurality of related clusters to a plurality of buckets, with each bucket representing a book in the book series, the assigning responsive at least in part to values of fields of the book records; and determining an order of the books in the set of books responsive at least in part to values of fields of the book records.

18. The computer system of claim 14, further comprising instructions executable to perform steps comprising:

providing information describing the identified name of the book series responsive to a search query received from a client.

* * * * *